(12) United States Patent
Raffard et al.

(10) Patent No.: US 8,668,135 B2
(45) Date of Patent: Mar. 11, 2014

(54) AUTOMATIC CONFIGURATION OF A TERMINAL

(75) Inventors: Remi Raffard, Paris (FR); Laurent Fourreau, Evrecy (FR)

(73) Assignee: France Telecom, Paris (FR)

(*) Notice: Subject to any disclaimer, the term of this patent is extended or adjusted under 35 U.S.C. 154(b) by 70 days.

(21) Appl. No.: 13/202,059

(22) PCT Filed: Feb. 24, 2010

(86) PCT No.: PCT/FR2010/050313
§ 371 (c)(1),
(2), (4) Date: Aug. 17, 2011

(87) PCT Pub. No.: WO2010/097544
PCT Pub. Date: Sep. 2, 2010

(65) Prior Publication Data
US 2011/0297740 A1   Dec. 8, 2011

(30) Foreign Application Priority Data
Feb. 27, 2009   (FR) .................................... 09 51250

(51) Int. Cl.
*G07F 17/00* (2006.01)
(52) U.S. Cl.
USPC ......................................... 235/375; 235/380
(58) Field of Classification Search
USPC .......... 235/462.44, 462.45, 462.46, 375, 380, 235/487, 492
See application file for complete search history.

(56) References Cited

U.S. PATENT DOCUMENTS

| 5,053,774 A | * | 10/1991 | Schuermann et al. | ..... 340/10.34 |
| 7,369,851 B2 | * | 5/2008 | Okonnen et al. | ........... 455/435.1 |
| 2004/0166839 A1 | | 8/2004 | Okkonen et al. | |

FOREIGN PATENT DOCUMENTS

WO   2008/028989   3/2008

OTHER PUBLICATIONS

GSMA, "mobile NFC technical guidelines version 2.0," pp. 1-95, http://www.gsmworld.com/documents/nfc/gsma_nfc2_wp.pdf, extracted Sep. 9, 2008.
Search Report and Written Opinion for corresponding application PCT/FR2010/050313 dated May 26, 2010.

* cited by examiner

*Primary Examiner* — Karl D Frech
(74) *Attorney, Agent, or Firm* — David D. Brush; Westman, Champlin & Koehler, P.A.

(57) ABSTRACT

A method and apparatus are provided for requesting configuration of a terminal connected to a subscriber card that contains at least one application. The terminal is adapted to receive via a second communications interface a response to a request including configuration information of the terminal, to act for at least one application of the subscriber card to determine whether an interface application associated with the at least one application is or is not present in the terminal. The terminal is adapted to send via a first telecommunications interface at least one command for downloading the interface application, if the interface application not present. A configuration method and apparatus are also provided for sending configuration information in response to a request, to receive at least one download command and to transmit it to a remote server, and to update the configuration information, after downloading the interface application specified in the command.

15 Claims, 3 Drawing Sheets

AUTOMATIC CONFIGURATION OF A TERMINAL

CROSS-REFERENCE TO RELATED APPLICATIONS

This Application is a Section 371 National Stage Application of International Application No. PCT/FR2010/050313, filed Feb. 24, 2010 and published as WO 2010/097544 on Sep. 2, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telecommunications, and more particularly to the field of subscriber smart cards for inserting in mobile communications terminals, and also to the associated terminals.

BACKGROUND OF THE DISCLOSURE

Most existing mobile terminals serve not only to make telephone calls, but also to execute a certain number of applications, e.g. comprising payment applications, loyalty applications, or indeed transport applications.

In such systems, the applications are stored in the subscriber smart card for reasons of security. An interface application associated with each application and stored in the mobile terminal serves to manage the interface with the user.

These applications may be so-called "conventional" applications. Under such circumstances, they are executed as a result of the subscriber smart card receiving a command issued by the interface application at the request of the user of the terminal.

These applications may also be so-called "contactless" applications. These applications may then operate when the subscriber card is inserted in a mobile terminal that is fitted with a contactless communications module. Under such circumstances, they are executed as a result of the subscriber card receiving a command issued by a remote base, reception being via the contactless communications module of the terminal. The interface program serves in particular to inform the user as a result of the associated application being executed.

The operation of such applications thus requires the terminal to be configured in a manner that is compatible with the applications installed in the subscriber card.

Terminal configurations vary between operators and/or manufacturers.

Thus, when a subscriber card is inserted in a terminal, it need not be configured in a manner suitable for enabling the applications installed in the subscriber card to operate. Thus, applications may not operate at all or, on the contrary, they may operate without the user being aware of that. For example, if the terminal interface applications that are associated with applications stored in the subscriber card are not installed in the mobile terminal, then the user will have no response concerning operations performed by the applications of the subscriber card.

In order to obtain an appropriate configuration, the user needs to contact the operator associated with the subscriber card.

Changing mobile terminal is an operation that is becoming more and more frequent. The need to contact the operator on each change can become time-consuming for the user.

SUMMARY

There therefore exists a need to configure a mobile terminal automatically when a subscriber smart card is inserted therein.

To this end, an exemplary embodiment of the invention provides a configuration request method for a terminal connected to a subscriber card, said card containing at least one application, the method being characterized in that, after a step of exchanging initialization information between said terminal and said subscriber card via a first communications interface, it comprises:
   a send step of sending a request for configuration information of the terminal via a second communications interface;
   a receive step of receiving via the second communications interface a response to the request, the response including configuration information of said terminal;
   for at least one application of the subscriber card, a determination step acting as a function of the received configuration information to determine whether an interface application associated with said at least one application is or is not present in the terminal; and
   a send step of sending via the telecommunications interface, at least one command for downloading said interface application, if not present.

Thus, the subscriber smart card detects whether the terminal in which it is inserted is properly configured, and if the terminal is not properly configured, it acts via the terminal to request a remote server to download one or more programs enabling an appropriate configuration to be obtained.

A subscriber card is a secure element. Automatically configuring the terminal at the initiative of the subscriber card enables the subscriber card to operate in an operating environment that matches its own content, regardless of the terminal in which it has been inserted. This makes it possible to guarantee proper operation of the applications installed in the subscriber card.

In a particular implementation of the configuration request method, the interface application is suitable for managing all of the interface applications present in the terminal. Thus, the downloading of an interface application subsequently enables the terminal to configure all of the other applications of the terminal.

According to a particular characteristic of the configuration request method, the request includes an address of a register of a contactless communications module of the terminal, and the response contains at least a portion of the content of said register. The presence of an address in the request gives rapid access to the information.

According to a particular characteristic, the register contains information concerning the presence or absence of at least one interface application. A single register thus makes it possible to obtain information about whether one or more interface applications are or are not installed in the terminal.

An embodiment of the invention also provides a configuration method for configuring a terminal connected to a subscriber card, said card containing at least one application, the method being characterized in that, after an exchange of initialization information between said terminal and said subscriber card via a first communications interface, it comprises:

a receive step of receiving via a second communications interface a request for configuration information of the terminal;

a send step of sending a response to the request via the second communications interface, the response including configuration information of said terminal; and if at least one interface application associated with an application of the subscriber card is not present in said terminal:

a receive step of receiving via the first telecommunications interface at least one command for downloading an interface application associated with said application of the subscriber card;

a transmit step of transmitting said at least one command to a remote server; and an updating step of updating the configuration information after downloading the interface application specified in the command.

Thus, the terminal is updated as soon as it is started or a new subscriber card is inserted. Updating enables the applications installed in the subscriber card to operate appropriately. The user may therefore insert a subscriber card in any new terminal and have the terminal updated without any need for action on the part of the user and without it being necessary to visit the operator.

According to a characteristic of the configuration method, the configuration information is contained in a register of a contactless communications module of the mobile terminal.

According to another particular characteristic of the configuration method, the request includes an address of a register of a contactless communications module of the terminal, and the response contains at least a portion of the content of said register.

In a particular implementation of the configuration method, the interface application is suitable for managing all of the interface applications present in the terminal. Thus, downloading a single interface application into the terminal makes it possible subsequently for the terminal to determine which interface applications are missing.

According to a particular characteristic of the configuration method, the updating step of updating the configuration information includes sending a command to a contactless communications module of the terminal via a third communications interface. The access to configuration information solely by the contactless communications module provides better security and thus greater compatibility between terminals.

According to a particular characteristic of the configuration method, the step of updating the configuration information is reiterated while the terminal is downloading a new interface application. Thus, on the next start or when changing subscriber cards, it will not be necessary to download the application. The configuration information thus makes it possible to know which interface applications have been downloaded.

An embodiment of the invention also provides a subscriber card suitable for being inserted in a terminal and containing at least one application, said card being suitable for exchanging initialization information with the terminal via a first communications interface and via a first data send/receive module, the card being characterized in that it comprises:

a second data send/receive module suitable for sending a request for configuration information of the terminal via a second communications interface, and suitable for receiving a response to the request via the second communications interface, the response including configuration information of said terminal;

determination means suitable for acting for at least one application of the subscriber card and as a function of the received configuration information to determine whether an interface application associated with said at least one application is or is not present in the terminal; and in that the first data send/receive module is suitable for sending at least one command for downloading said interface application, if not present, via the first telecommunications interface.

An embodiment of the invention also provides a terminal suitable for being connected to a subscriber card containing at least one application, said terminal being suitable for exchanging initialization information with the subscriber card via a first communications interface and via first data communications module, the terminal being characterized in that it comprises:

a contactless communications module containing a first data send/receive module suitable for receiving a request for configuration information of the terminal via a second communications interface, and for sending a response to the request via the second communications interface, the response including configuration information of said terminal;

said first communications module of the terminal being suitable for receiving at least one command for downloading an interface application associated with an application of the subscriber card via a first telecommunications interface;

transmission means for transmitting said at least one command to a remote server; and updating means for updating the configuration information after downloading the interface application specified in the command.

An embodiment of the invention also provides a computer program product including instructions for implementing the steps of a configuration request method as described above, when loaded and executed by a processor.

Finally, an embodiment of the invention provides a computer program product including instructions for implementing the steps of a configuration method as described above, when loaded and executed by a processor.

BRIEF DESCRIPTION OF THE DRAWINGS

Other features and advantages appear from the following description of implementations given by way of non-limiting example, and with reference to the accompanying drawings, in which.

DETAILED DESCRIPTION OF ILLUSTRATIVE EMBODIMENTS

An implementation of a configuration request method and of a configuration method is described below with reference to FIGS. 1 and 2.

Figure 1:
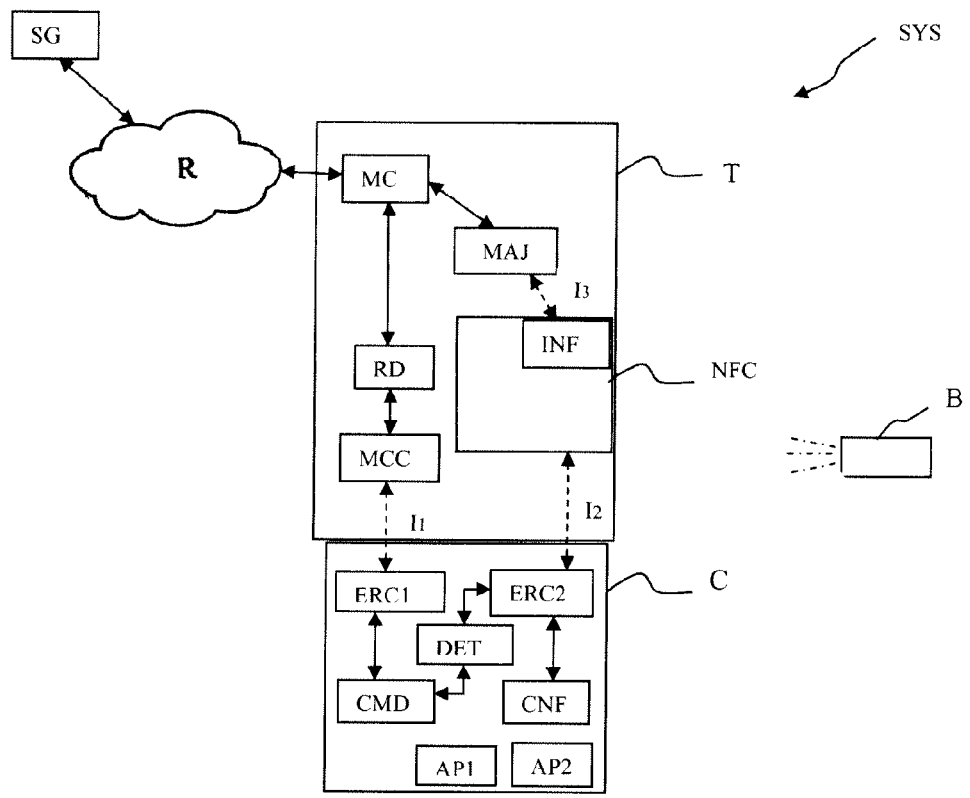
FIG. 1 is a diagram showing the general context of an embodiment of the invention.

With reference to FIG. 1, a system SYS includes a terminal T and a subscriber card C suitable for being inserted in the terminal T.

By way of example, the terminal T is a mobile telephone or a personal digital assistant (PDA).

The terminal T includes a first communications module MCC suitable for communicating with the subscriber card C via a first communications interface I1.

The terminal T also possesses a second communications module MC, e.g. a GSM module, suitable for enabling communication over a communications network R with remote servers, e.g. a management server SG. By way of example, this communication is over the air (OTA) communication, i.e. conventional wireless communication. As an alternative, the terminal T may be connected to the network R via a wired telephone line.

The terminal T also includes a contactless communications module NFC. The contactless communications module NFC is suitable for communicating via a contactless connection with remote equipment, e.g. a base B situated in the proximity of the terminal T. The contactless module NFC is also suitable for dialoguing with the subscriber card C via a second communications interface I2.

The terminal T also includes a redirection module RD and an updating module MAJ for updating configuration information.

By way of example, the subscriber card C is a removable medium of the subscriber identity module (SIM) type or of the universal integrated circuit card (UICC) type, or a memory card hosting a secure element (SD card, embedded secure controller, . . . ).

One or more applications (AP1, AP2, . . . ) is/are recorded in the subscriber card C. These applications may be so-called "contactless" applications.

The subscriber card C comprises a first send/receive module ERC1 suitable for dialoguing with the terminal T via the first communications interface I1, a second send/receive module ERC2 suitable for communicating with the terminal T via the second communications interface I2, a configuration module CNF, a control module CMD, and a determination module DET.

Figure 2:
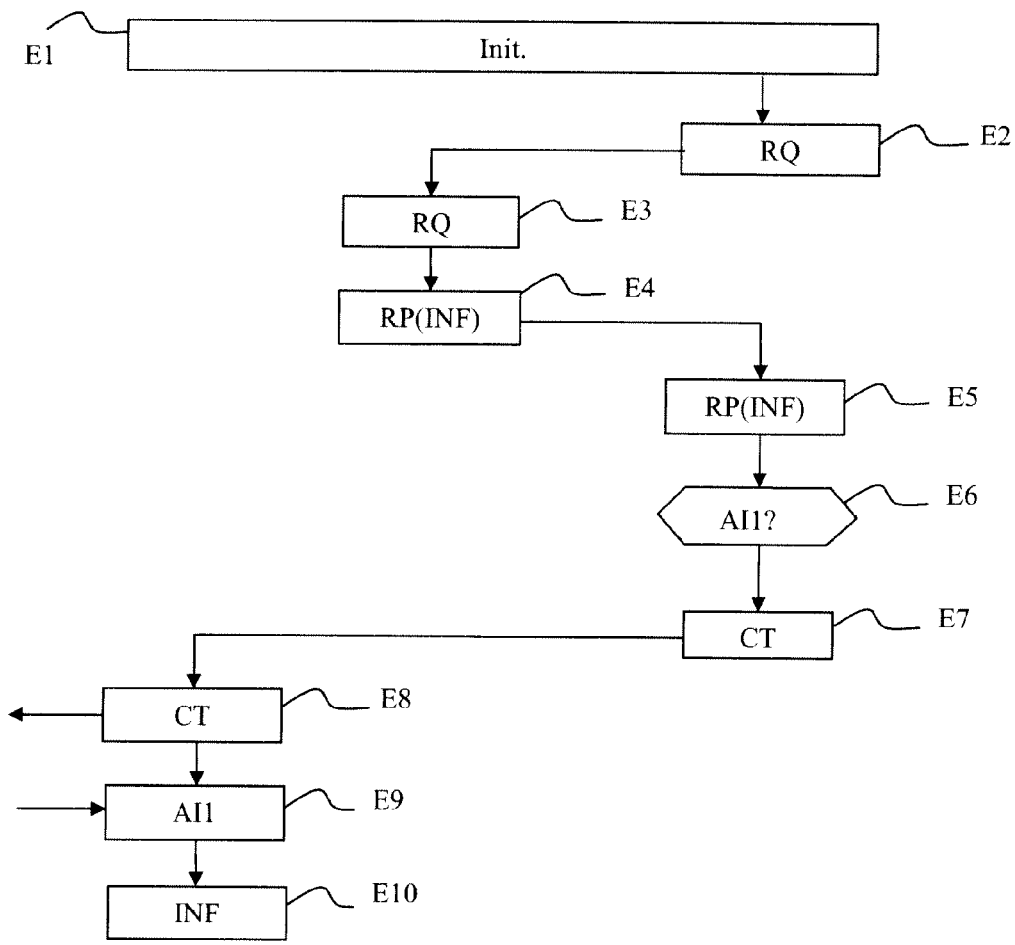
FIG. 2 is a flow chart showing the various steps of a configuration request method and a configuration method of an embodiment of the invention.

With reference to FIG. 2, the various steps of a configuration request method and of a configuration method in an implementation of the invention are described below.

In a first step E1 of starting the terminal, as a result of a user request or on a new subscriber card being inserted into the terminal, the terminal T initializes an initialization data exchange INIT with the subscriber card C via the first communications interface I1.

After this exchange of data, during a step E2, the configuration module CNF of the subscriber card C sends a configuration information request RQ to the contactless module NFC of the terminal T via the second send/receive module ERC2 and the second communications interface I2.

The request RQ is received by the contactless module NFC in a step E3.

The step E3 is followed by a step E4 during which the contactless module NFC reads configuration information INF from a memory M of the terminal T or of the contactless module NFC of the terminal T, and sends a response RP containing the configuration information INF via the second communications interface I2.

The second send/receive module ERC2 of the subscriber card C receives the response RP containing the configuration information INF during a step E5, and it sends it to the determination module DET of the subscriber card C.

The step E5 is followed by a step E6 during which the determination module DET of the subscriber card C acts for one or more applications of the subscriber card C to determine the presence or absence in the terminal T of an interface application associated with each application, as a function of the configuration information INF it has received. For example, the determination module DET determines whether an interface application AI1 associated with the application AP1 is or is not present in the terminal T.

If the associated interface application(s) is/are present, then the process terminates. The subscriber card C positions itself to wait for a command from the terminal T or from the contactless module NFC.

If the associated interface application(s) is/are not present in the terminal T, then the control module CMD of the subscriber card C acts during a step E7 to send at least one downloading command CT for the associated interface application(s) to the terminal T via the first data send/receive module ERC1 of the subscriber card and via the first communications interface I1. For example, the command CT is an order for downloading the interface application AI1 associated with the application AP1.

During a step E8, the redirection module RD of the terminal T receives the downloading command CT via the first communications interface of the first communications module MCC and transmits it to the management server SG via the second communications module MC of the terminal T.

The step E8 is followed by a step E9 during which the interface application(s) specified in the command is/are received by the terminal T via the second communications module MC and the network R and is/are stored in a memory of the terminal T. For example, the interface application AI1 is received by the terminal T.

Then, during a step E10, the configuration information INF is updated in the memory M by the updating module MAJ of the terminal T, thereby indicating the presence of the received interface application(s) in the terminal T. The updating module MAJ is suitable for accessing the memory M via a third communications interface I3.

A particular implementation in which the subscriber card contains an application for managing applications is described below with reference to FIGS. 3 and 4.

Figure 3:
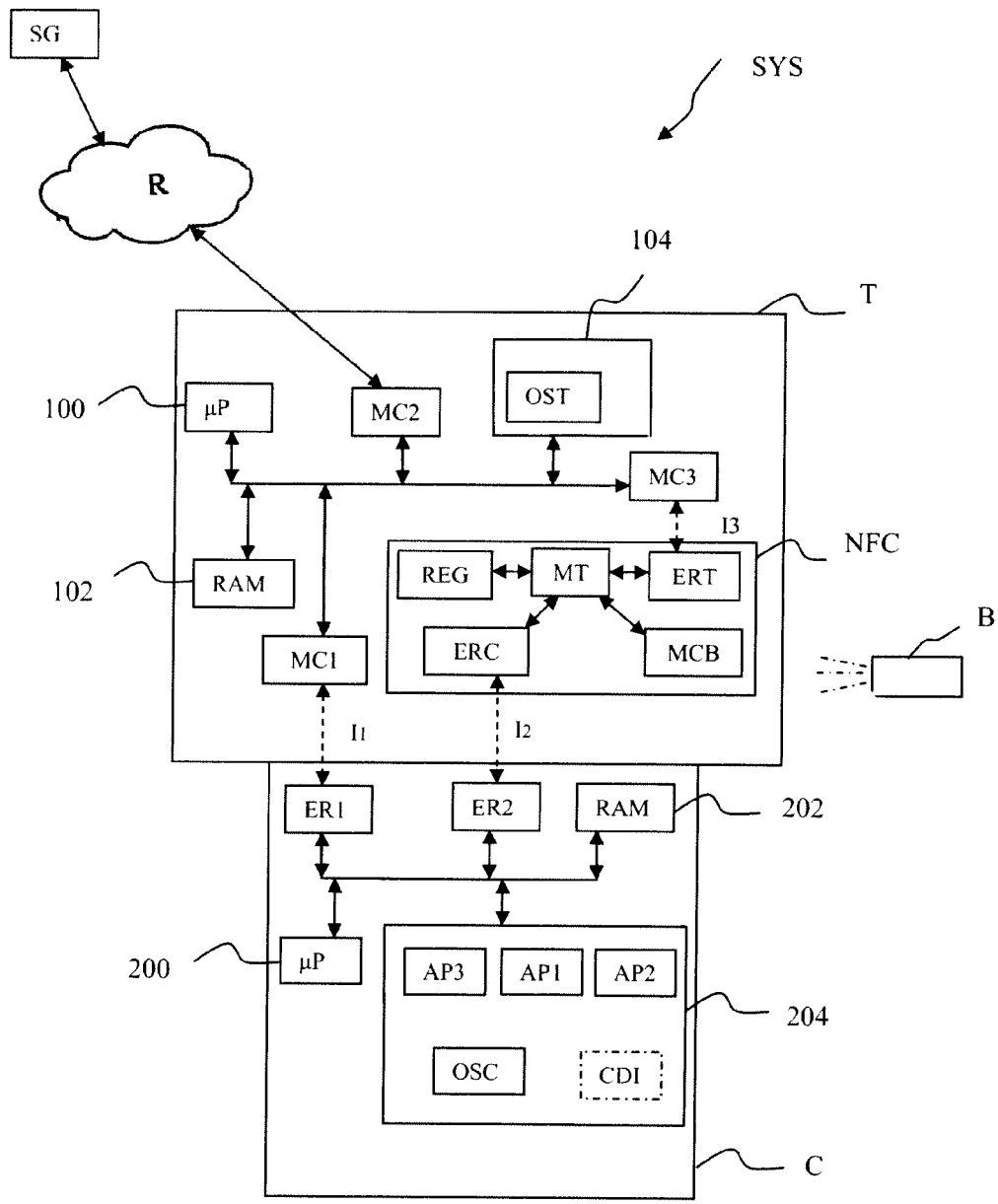
FIG. 3 is a block diagram showing a system suitable for implementing the steps of a configuration request method and of a configuration method in an embodiment of the invention.

With reference to FIG. 3, the terminal T of the system SYS possesses in particular a processor unit 100 having a microprocessor, a random access memory (RAM) 102, one or more read only memories (ROMs) or electrically erasable programmable read only memories (EEPROMs) 104 having programs recorded therein suitable for being executed by the microprocessor. These programs include a main program constituting an operating system for the terminal (OST).

In conventional and non-exclusive manner, the main terminal T may include the following elements: a keyboard, a screen, a microphone, a loudspeaker, storage means, . . . .

The terminal T includes a first communications module MC1 for sending and receiving data to and from a subscriber card via a first communications interface I1. The first communications interface I1 may for example be an interface in compliance with the standard ISO 7816.

The terminal T also includes a second communications module MC2, e.g. a GSM module, suitable for communicating via a communications network R with remote servers, e.g. with a management server SG.

The terminal T also possesses a third communications module MC3 suitable for communicating with a contactless communications module NFC, via a third communications interface I3.

The terminal T also includes a contactless communications module NFC. The contactless communications module NFC comprises a communications module MCB for communicating via a contactless connection with remote equipment, e.g. a base B situated in the proximity of the terminal T.

The contactless module NFC also includes a first data send/receive module ERC for sending and receiving data to and from the subscriber card C via a second communications interface I2. The second communications interface I2 may for example be a single wire protocol (SWP) interface as defined in the standard ETSI TS 102.613 release 7 and it may, for example, use the host controller interface (HCI) protocol as defined in the standard ETSI TS 102.622 release 7.

The contactless module NFC also comprises a second data send/receive module ERT suitable for communicating with the terminal T via the third communications interface I3.

The contactless module NFC of the terminal T includes a register REG, e.g. a memory of the EEPROM type.

As an alternative, the register REG may be a memory zone of the terminal T that is accessible at least for reading by the contactless module NFC of the terminal T.

The register REG is initialized during a prior step, e.g. during manufacture of the terminal T.

The contactless module NFC also includes a processor module MT fitted with a microprocessor.

By way of example, the subscriber card C is a subscriber card of the UICC type.

Also with reference to FIG. 3, the subscriber card C includes in particular a microprocessor 200, a first send/receive module ER1, a second send/receive module ER2, one or more RAMs 202, and one or more ROM or EEPROM type memory 204 having programs stored therein suitable for being executed by the microprocessor 200. These programs include a main program referred to as an operating system for the card (OSC), an application CDI for managing applications of the subscriber card, and one or more applications (AP1, AP2, . . . ) from service providers.

The first send/receive module ER1 of the subscriber card C is suitable for receiving and sending data from or to the terminal T, via the first communications interface I1.

The second send/receive module ER2 of the subscriber card C is suitable for receiving or sending data from or to the contactless module NFC of the terminal T, via the second communications interface I2.

It should be recalled that the ISO 7816 interface and the SWP interface use different physical contacts of a subscriber card for sending data.

During the first step E1, the terminal T exchanges initialization data INIT with the subscriber card C via the first communications interface I1, the first communications module MC1 of the terminal T, and the first send/receive module ER1 of the subscriber card C. By way of example, this data exchange makes it possible to determine the rate of dialog between the terminal and the subscriber card and/or to send information about the terminal profile. During this exchange, the terminal may for example send an event referred to as an "event command after ATR" (as described in the standard ETSI TS 102.241 release 6, chapter 6.2). This event triggers the launching of the management application CDI of the subscriber card C.

As an alternative, the management application CDI may be launched on receiving another event or command sent by the terminal T during the exchange of initialization data INIT.

During the following step E2, the management application CDI of the subscriber card C sends a configuration information request RQ1 to the contactless module NFC of the terminal T via the second data send/receive module ER2 of the subscriber card C and the second communications interface I2. By way of example, the request RQ1 is an "any get parameter" command HCI including an index of the register REG as a parameter. The "any get parameter" command HCI is defined in the standard ETSI TS 102.622 release 7, chapter 8.2.

By way of example, the memory REG contains a predetermined number of bits, each bit is allocated to a determined operator, and the index of the register REG contained in the command RQ1 is a position (or offset) in the register REG for the bit reserved for the operator managing the subscriber card C.

The request RQ1 is received by the first data send/receive module ERC of the contactless module NFC during the step E3 and sent to the processor module MT of the contactless module NFC.

If the terminal T does not possess a contactless module, it does not receive the request, and the process terminates.

If the contactless module NFC does not implement the second communications interface I2, i.e. if the contactless module NFC does not understand the commands HCI in this implementation, then the process terminates.

Otherwise, the step E3 is followed by a step E4 during which the processor module MT of the contactless module NFC reads the register REG in memory and sends the value contained at the received index in the register REG via the first data send/receive module ERC of the contactless module NFC and the second communications interface I2. The value contained at the received index in the register REG represents configuration information INF.

For example, the index contains a bit that may be set at 1 or 0 indicating whether an interface application CPI associated with the application CDI for managing applications in the subscriber card C is or is not present in the terminal T.

During the step E5, the subscriber card C receives the configuration information INF.

Step E5 is followed by a step E6 during which the subscriber card C determines, as a function of the received configuration information INF whether an interface application CPI associated with the application CDI for managing applications of the subscriber card C is or is not present in the terminal T.

If the received configuration information INF has a predetermined value, e.g. 1, then the interface application CPI associated with the management application CDI is present. The information that the interface application CPI is present informs the management application CDI, and thus the subscriber card C, that the terminal T is properly configured to operate with the inserted subscriber card C. Under such circumstances, the process terminates and the subscriber card C takes up, for example, a position waiting for a command from the terminal T or the contactless module NFC.

If the received configuration information INF does not have the predetermined value, then the interface application CPI is not present in the terminal T. Under such circumstances, during the step E7, the management application CDI sends a command CT for downloading the interface application CPI associated with the management application CDI to the terminal T via the first data send/receive module ER1 and the first telecommunications interface I1.

By way of example, the command CT is a short message service (SMS) message containing the number of the server SG, e.g. a "send short message" command as defined in the standard ETSI TS 102.233 release 4, chapter 6.4.

As an alternative, the command CT is a request for a hypertext transfer protocol (HTTP) connection at the IP address of the server SG. The connection request may for example be a "launch browser" command as defined in the standard ETSI TS 102.223 release 4, chapter 6.4.

The command CT also contains information identifying the terminal T, e.g. the international mobile equipment identify (IMEI) number of the terminal T. The IMEI number of the terminal T may be obtained, for example, by the subscriber card C in response to a "provide-local-information" command sent by the subscriber card C to the terminal T via the first communications interface I1. The "provide-local-information" command is defined in the standard ETSI TS 102.223.

During the step E8, the terminal T receives the downloading command CT and transmits it to the management server SG via the second communications module MC2 of the terminal T and the network R.

As an alternative, the command CT received during the step E8 does not contain identification information concerning the terminal T, and this information is added by the terminal T before sending the command CT to the management server SG.

The step E8 is followed by a step E9 during which the interface application CPI associated with the management application CDI is received by the terminal T via the second communications module MC2 and is stored in a memory of the terminal T.

Thereafter, during the step E10, the terminal T commands updating of the configuration information INF in the register REG. For example, updating may consist in setting the bit allocated to the operator managing the subscriber card C to a predetermined value, e.g. to 1, thereby indicating the presence of the interface application CPI in the terminal T.

By way of example, this updating is performed by the terminal T sending an "any set parameter" command HCI as defined in the standard ETSI TS 102.622 release 7, chapter 8.2 via the third communications module MC3 of the terminal T and via the third communications interface I3. The command as sent is received by the second send/receive module ERT of the contactless module NFC and is sent to the processor module MT that updates the register REG.

After being installed, the interface application CPI is launched in conventional manner and the interface application CPI determines which other interface applications need to be downloaded and commands the downloading thereof. For example, the interface application CPI associated with the application CDI for managing the applications of the subscriber card C interrogates the management application CDI via the first communications interface I1 in order to obtain the list of applications installed in the subscriber card C. After receiving this information, the interface application CPI determines which of the interface applications associated with the applications of the subscriber card are not installed in the terminal T. Thereafter the interface application CPI commands downloading of these applications from the server SG.

A second implementation is described below.

In this implementation, the card operating system OSC and three applications AP1, AP2, and AP3 of service providers are installed in the subscriber card C.

For example, the application AP1 is a transport application, the application AP2 is a payment application, and the application AP3 is a loyalty application.

An interface application AI1 is associated with the application AP1, an interface application AI2 is associated with the application AP2, and an interface application AI3 is associated with the application AP3.

The register REG of the contactless module NFC is installed during a prior stage of configuring the terminal T, e.g. during manufacture.

During the first step E1 of starting, the terminal T initializes an initialization data exchange INIT with the subscriber card C.

During the following step E2, the main program OSC of the subscriber card C sends a configuration information request RQ2 to the contactless module NFC of the terminal T via the second communications interface I2. The request RQ2 may for example be an "any get parameter" command HCI including as its parameter an index of the register REG of the contactless communications module NFC.

In this implementation, the register REG contains a predetermined number of bits forming one or more groups, each group being allocated to a predetermined operator. Furthermore, each bit is associated with an interface application.

Figure 4:
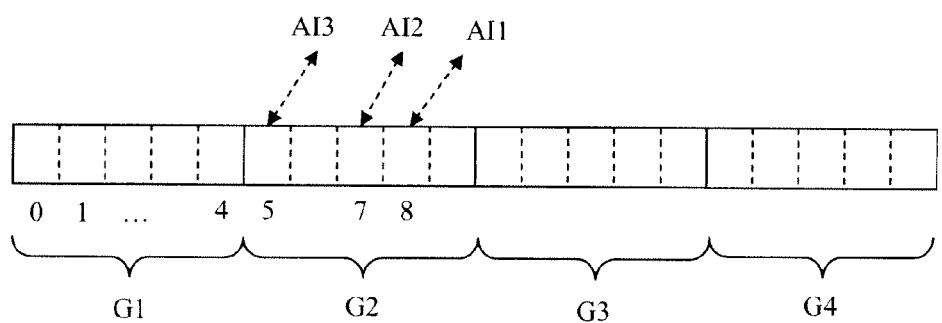
FIG. 4 is a diagram showing an example of a register suitable for containing configuration information of an embodiment of the invention.

An example of the register REG is shown in FIG. 4. In this example, the register REG contains four groups G1, G2, G3, and G4, each having five bits. The group G2 is allocated to the operator managing the subscriber card C. The bit 5, which is a bit of the group G2, is associated with the interface application AI3 associated with the application AP3, the bit 7 is associated with the interface application AI2 associated with the application AP2, and the bit 8 is associated with the interface application AI1 associated with the application AP1.

In the implementation described, the index of the register REG contained in the command is an address enabling the contactless module NFC to reach the group G2 of the register REG, where the group G2 in this example is the group reserved for the operator managing the subscriber card C. As an alternative, the index could be a position (or offset) relative to the starting address of the register REG, e.g. the offset corresponding to the group G2.

The request RQ2 is received by the contactless module NFC during the step E3.

During the step E4, the contactless module NFC reads the register REG from memory and sends the content of the register REG concerning the group G2, i.e. the five bits of the group G2 to the subscriber card C via the second communications interface I2. These five bits represent configuration information INF.

If it is assumed that only the interface application AI2 associated with the application AP2 is installed in the terminal T, then the configuration information as sent is "00100".

During the following step E5, the subscriber card C receives the configuration information INF.

During the following step E6, the main program OSC of the subscriber card C acts as a function of the configuration information it has received to determine whether the interface application AI2 associated with the application AP2 of the subscriber card is present in the terminal T and whether the interface applications AI1 and AI3 associated respectively with the applications AP1 and AP3 of the subscriber card C are absent from the terminal T.

During the step E7, the program OSC of the subscriber card C commands the sending of a command CT1 for downloading the interface application AI1 and a command CT2 for downloading the interface application AI3 to the terminal T via the first data send/receive module ER1 and the first telecommunications interface I1.

During the step E8, the terminal T receives the downloading commands CT1 and CT2 and relays them to the management server SG via the second communications module MC2.

The step E8 is followed by the step E9 during which the interface applications AI1 and AI3 associated with the applications AP1 and AP3 are received by the terminal T via the second communications module MC2 of the terminal T, and are then stored in the memory of the terminal T, e.g. in a memory 104 of the EEPROM type.

Thereafter, during step E10, the terminal T updates the register REG. To do this, it sends a "set parameter" command HCI including the value 10110 as a parameter and the value of the index to the contactless module NFC via the third interface I3.

Thereafter, if the terminal T proceeds to download a new interface application, e.g. as a result of a request made by the user of the terminal T, after this new interface application has been downloaded, the terminal T updates the register REG of the contactless communications module NFC.

The two above-described implementations are given by way of example and they may be combined.

For example, the register REG may contain a first portion in which one bit is allocated per operator, and a second portion indicating the installed interface applications. The subscriber card C may thus command the downloading of an interface application CPI associated with an application CDI for managing the applications of the subscriber card, followed by downloading the interface applications associated with the applications of the service providers present in the subscriber card.

In a variant implementation, after the initialization step E1, the subscriber card C sends a command to obtain an identity number of the terminal T, e.g. the IMEI number to the terminal T via the first communications interface I1. The received identity number is compared with an identity number stored in the subscriber card. If the identity numbers are identical, then the terminal T corresponds to the terminal that was used during the preceding use of the subscriber card and steps E2 to E10 are not implemented. In contrast, if the received identity number is different from the stored identity number, then the stored identity number is replaced in memory by the received identity number and steps E2 and E10 are implemented. This variant serves to limit the implementation of the configuration request method and of the configuration method to circumstances in which the subscriber card has detected a change of terminal.

Although the present disclosure has been described with reference to one or more examples, workers skilled in the art will recognize that changes may be made in form and detail without departing from the scope of the disclosure and/or the appended claims.

The invention claimed is:

1. A configuration request method for a terminal connected to a subscriber card, said card containing at least one application, the method comprising:
after a step of exchanging initialization information between said terminal and said subscriber card via a first communications interface, performing the following steps:
a send step of sending a request for configuration information of the terminal via a second communications interface;
a receive step of receiving via the second communications interface a response to the request, the response including configuration information of said terminal;
for at least one application of the subscriber card, a determination step acting as a function of the received configuration information to determine whether an interface application associated with said at least one application is or is not present in the terminal; and
a send step of sending via the first communications interface, at least one command for downloading said interface application, if not present.

2. The configuration request method according to claim 1, wherein the interface application is suitable for managing all of the interface applications present in the terminal.

3. The configuration request method according to claim 1, wherein the request includes an address of a register of a contactless communications module of the terminal, and the response contains at least a portion of the content of said register.

4. The configuration request method according to claim 3, wherein the register contains information concerning the presence or absence of at least one interface application.

5. A configuration method for configuring a terminal connected to a subscriber card, said card containing at least one application, the method comprising:
after an exchange of initialization information between said terminal and said subscriber card via a first communications interface, performing the steps of:
a receive step of receiving via a second communications interface a request for configuration information of the terminal;
a send step of sending a response to the request via the second communications interface, the response including configuration information of said terminal; and
if at least one interface application associated with an application of the subscriber card is not present in said terminal:
a receive step of receiving via the first communications interface at least one command for downloading an interface application associated with said application of the subscriber card;
a transmit step of transmitting said at least one command to a remote server; and
an updating step of updating the configuration information after downloading the interface application specified in the command.

6. The configuration method according to claim 5, wherein the configuration information is contained in a register of a contactless communications module of the mobile terminal.

7. The configuration method according to claim 5, wherein the request includes an address of a register of a contactless communications module of the terminal, and the response contains at least a portion of the content of said register.

8. The configuration method according to claim 5, wherein the interface application is suitable for managing all of the interface applications present in the terminal.

9. The configuration method according to claim 5, wherein the updating step of updating the configuration information includes sending a command to a contactless communications module of the terminal via a third communications interface.

10. The configuration method according to claim 5, wherein the step of updating the configuration information is reiterated while the terminal is downloading a new interface application.

11. A subscriber card comprising:
at least one application contained in the card;
a configuration suitable for being inserted in a terminal;

a first data send/receive module configured for exchanging initialization information with the terminal via a first communications interface;

a second data send/receive module configured for sending a request for configuration information of the terminal via a second communications interface, and configured for receiving a response to the request via the second communications interface, the response including configuration information of said terminal;

determination means for acting for at least one application of the subscriber card and as a function of the received configuration information to determine whether an interface application associated with said at least one application is or is not present in the terminal; and wherein the first data send/receive module is configured for sending at least one command for downloading said interface application, if not present, via the first communications interface.

12. A terminal comprising:

a configuration suitable for being connected to a subscriber card containing at least one application;

a first data communications module configured for exchanging initialization information with the subscriber card via a first communications interface;

a contactless communications module containing a first data send/receive module configured for receiving a request for configuration information of the terminal via a second communications interface, and for sending a response to the request via the second communications interface, the response including configuration information of said terminal;

said first communications module of the terminal being configured for receiving at least one command for downloading an interface application associated with an application of the subscriber card via a first communications interface;

transmit means for transmitting said at least one command to a remote server; and updating means for updating the configuration information after downloading the interface application specified in the command.

13. A system comprising the terminal according to claim 12 and the subscriber card, wherein the subscriber card comprises:

the at least one application;

a configuration suitable for being inserted in the terminal;

a first data send/receive module configured for exchanging initialization information with the terminal via the first communications interface;

a second data send/receive module configured for sending the request for configuration information of the terminal via the second communications interface, and configured for receiving the response to the request via the second communications interface;

determination means for acting, for at least one application of the subscriber card and as a function of the received configuration information, to determine whether the interface application associated with said at least one application is or is not present in the terminal; and wherein the first data send/receive module is configured for sending said at least one command for downloading said interface application, if not present, via the first communications interface.

14. A computer program product stored on a non-transitory memory that is readable by a processor and includes instructions for implementing the steps of a configuration request method for a terminal connected to a subscriber card, said card containing at least one application, when the program is loaded and executed by the processor, wherein the method comprises:

after a step of exchanging initialization information between said terminal and said subscriber card via a first communications interface performing the following steps:

a send step of sending a request for configuration information of the terminal via a second communications interface;

a receive step of receiving via the second communications interface a response to the request, the response including configuration information of said terminal;

for at least one application of the subscriber card, a determination step acting as a function of the received configuration information to determine whether an interface application associated with said at least one application is or is not present in the terminal; and a send step of sending via the first communications interface, at least one command for downloading said interface application, if not present.

15. A computer program product stored on a non-transitory memory that is readable by a processor and includes instructions for implementing the steps of a configuration method for configuring a terminal connected to a subscriber card, said card containing at least one application, when the program loaded and executed by the processor, wherein the method comprises:

after an exchange of initialization information between said terminal and said subscriber card via a first communications interface, performing the steps of:

a receive step of receiving via a second communications interface a request for configuration information of the terminal;

a send step of sending a response to the request via the second communications interface, the response including configuration information of said terminal; and if at least one interface application associated with an application of the subscriber card is not present in said terminal:

a receive step of receiving via the first communications interface at least one command for downloading an interface application associated with said application of the subscriber card;

a transmit step of transmitting said at least one command to a remote server; and an updating step of updating the configuration information after downloading the interface application specified in the command.

* * * * *

UNITED STATES PATENT AND TRADEMARK OFFICE
CERTIFICATE OF CORRECTION

PATENT NO. : 8,668,135 B2  Page 1 of 1
APPLICATION NO. : 13/202059
DATED : March 11, 2014
INVENTOR(S) : Raffard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 71 days.

Signed and Sealed this

Twenty-ninth Day of September, 2015

Michelle K. Lee
*Director of the United States Patent and Trademark Office*